US008830271B1

(12) United States Patent
Jordan et al.

(10) Patent No.: US 8,830,271 B1
(45) Date of Patent: Sep. 9, 2014

(54) DENSITY SMOOTHING A DISPLAY OF POINTS-OF-INTEREST DISPLAYABLE ON A MAP BASED ON RELATIVE PROMINENCE

(75) Inventors: Myles Jordan, Woodinville, WA (US); Bernhard Seefeld, New York, NY (US)

(73) Assignee: Google Inc., Mountain View, CA (US)

( * ) Notice: Subject to any disclaimer, the term of this patent is extended or adjusted under 35 U.S.C. 154(b) by 916 days.

(21) Appl. No.: 12/986,497

(22) Filed: Jan. 7, 2011

(51) Int. Cl.
*G09G 5/00* (2006.01)

(52) U.S. Cl.
USPC .......................................... 345/660; 345/611

(58) Field of Classification Search
CPC .. G01C 21/34; G01C 15/004; G01C 21/3626; G01C 21/3638; G06T 11/60; G06T 17/05
USPC .................................................. 345/611, 660
See application file for complete search history.

(56) References Cited

U.S. PATENT DOCUMENTS

| 5,742,924 A * | 4/1998 | Nakayama .................... 701/458 |
| 2005/0035883 A1* | 2/2005 | Kameda et al. ............ 340/995.1 |
| 2007/0076920 A1* | 4/2007 | Ofek ............................. 382/113 |
| 2011/0063301 A1* | 3/2011 | Setlur et al. ................... 345/441 |

* cited by examiner

*Primary Examiner* — Ke Xiao
*Assistant Examiner* — Robert Craddock
(74) *Attorney, Agent, or Firm* — Lerner, David, Littenberg, Krumholz & Mentlik, LLP

(57) ABSTRACT

A density smoothing server determines the zoom level at which one or more points-of-interest are to be displayed on an electronic map. The density smoothing server may be in communication with a global points-of-interest database, where the global points-of-interest database includes previously ranked points-of-interest. The density smoothing server selects a group of points-of-interest as local points-of-interest and extracts the local points-of-interest, along with corresponding prominence values, from the global points-of-interest database. Using a centroid determination manager and a centroid surface manager, the density smoothing server determines a number of centroids for the surface of the electronic map and then constructs centroid surfaces based on the determined centroids. A zoom level is assigned to each of the extracted local points-of-interest based on a comparison of the prominence values for the local points-of-interest with the constructed centroid surfaces.

20 Claims, 8 Drawing Sheets

DENSITY SMOOTHING A DISPLAY OF POINTS-OF-INTEREST DISPLAYABLE ON A MAP BASED ON RELATIVE PROMINENCE

BACKGROUND

With today's technology, a user may use a client device to view a map having displayable points-of-interest. These points-of-interest may include businesses, parks, recreational facilities, landmarks, distinguishing geographical features, or any other type of points-of-interest. However, on any given map, there are generally many more points-of-interest to display on the map than can be displayed on the client device without making the map hopelessly cluttered.

One approach to assist the client device in displaying as many points-of-interest at one time for a given zoom level is to use a ranking scheme to determine those points-of-interest that are more prominent than other points-of-interest. Hence, a typical ranking scheme may cause the client device to display points-of-interest that are more prominent than other points-of-interest depending on a zoom level for viewing the map displayed on the client device. However, under this scheme, a point-of-interest that is considered less prominent and is near a more prominent point-of-interest may never be displayed on the client device.

Moreover, because larger cities may have more points-of-interest that are of greater prominence than those of smaller cities, a system that determines which points-of-interest to display at a given time must also account for the local distribution of prominent points-of-interest in small cities as well as the local distribution of prominent points-of-interest in large cities. For example, a displaying scheme based on the ranks of features in New York City that produces an adequate distribution of points-of-interest across a high zoom level to a low zoom level, may also likely show few, if any, points-of-interest at lesser zoom levels in smaller cities.

Attempting to address the issues above by attempting to show everything at a shallow zoom level, then simply allowing higher-ranked points-of-interest to occlude nearby lower-ranked points-of-interest to reduce the clutter of having multiple points-of-interest displayed at one time reveals a more subtle problem: In such a scenario, it will be a common occurrence for a point-of-interest of a certain rank to be occluded by nearby, higher-ranked, local points-of-interest and yet another nearby point-of-interest of similar rank will not be so occluded, merely because it happens to not be near a higher-ranked point-of-interest.

BRIEF SUMMARY

An apparatus for density smoothing of points-of-interest displayable on an electronic map includes a computer-readable medium having a plurality of predefined zoom levels for viewing a surface, a plurality of divisions that divide the surface, and a plurality of executable instructions that define a plurality of managers comprising. The plurality of managers may include a local point-of-interest extraction manager, a centroid determination manager, a centroid surface manager, and a zoom level assignment manager.

The apparatus may also include a processor in communication with the computer-readable medium and operative to execute the executable instructions that, when executed, causes the local point-of-interest extraction manager to extract a plurality of local points-of-interest from a global points-of-interest database for each division of the plurality of divisions and extract a plurality of prominence values from the global points-of-interest database, wherein each prominence value of the plurality of prominence values correspond to a local point-of-interest from the plurality of local points-of-interest.

Execution of the executable instructions may also cause the centroid determination manager to determine a plurality of centroid values from the plurality of prominence values for each division from the plurality of divisions stored in the computer readable medium, wherein each centroid value is determined as a function of the plurality of predefined zoom levels stored in the computer readable medium; and the plurality of centroid values are grouped according to the plurality of predefined zoom levels.

Furthermore, the execution of the executable instructions may cause the centroid surface manager to construct a plurality of centroid surfaces from the plurality of centroid values determined by the centroid determination manager and the zoom level assignment manager to assign a predefined zoom level from the plurality of predefined zoom levels stored in the computer-readable medium to each local point-of-interest extracted by the local point-of-interest extraction manager based on a comparison of the prominence value corresponding to the local point-of-interest with a centroid surface from the plurality of centroid surfaces determined by the centroid surface manager.

In one embodiment of the apparatus, the computer-readable medium is further operative to store one or more databases, such as a local points-of-interest database operative to store the extracted plurality of local points-of-interest and the extracted plurality of prominence values extracted by the local point-of-interest extraction manager a centroid database operative to store the plurality of centroid values determined by the centroid determination manager, and a zoom level assignment database operative to store the assignments of the plurality of predefined zoom levels to the plurality of local points-of-interest determined by the zoom level assignment manager.

In another embodiment of the apparatus, execution of the executable instructions further causes the local point-of-interest extraction manager to extract the plurality of local points-of-interest from the global points-of-interest database based on a provided characteristic for the plurality of local points-of-interest.

In a further embodiment of the apparatus, execution of the executable instructions further causes the centroid determination manager to determine the plurality of centroid values from each plurality of prominence values for each division from the plurality of divisions based on the density of the local points-of-interest occurring within each division.

In yet another embodiment of the apparatus, each centroid value of the plurality of centroid values corresponds to a predefined zoom level of the plurality of predefined zoom levels.

In yet a further embodiment of the apparatus, execution of the executable instructions further causes the zoom level assignment manager to determine the displayability of a selected local point-of-interest from the plurality of local points-of-interest based on a predefined zoom level assigned to the selected local point-of-interest.

In another embodiment of the apparatus, a first local point-of-interest of the plurality of local points-of-interest corresponds to a first prominence value, a second local point-of-interest of the plurality of local points-of-interest corresponds to a second prominence value having an approximate value as the first prominence value, and execution of the executable instructions further causes the zoom level assignment manager to assign the first local point-of-interest a first predefined zoom level from the plurality of predefined zoom levels and assign the second local point-of-interest a second predefined zoom level different than the first predefined zoom level from the plurality of predefined zoom levels.

In a further embodiment of the apparatus, the predefined zoom levels comprise a low zoom level corresponding to a first height furthest from the surface, a high zoom level corresponding to a second height closest to the surface, and a middle zoom level corresponding to a third height that is less than the first height but greater than the second height. Moreover, execution of the executable instructions further causes the centroid surface manager to construct a low level centroid surface corresponding to the low zoom level, a middle level centroid surface corresponding to the middle zoom level, and a high level centroid surface corresponding to the high zoom level.

In yet another embodiment of the apparatus, each centroid value for a given one of the plurality of divisions is determined according to an exponential increase in the number of local points-of-interest displayable at a predefined zoom level for the given division.

In yet a further embodiment of the apparatus, the predefined zoom level is assigned to the local point-of-interest when the prominence value corresponding to the local point-of-interest exceeds the centroid surface value corresponding to the predefined zoom level.

A method for density smoothing of points-of-interest displayable on an electronic map is also disclosed. The method includes storing in a computer-readable medium a plurality of predefined zoom levels for viewing a surface and a plurality of divisions that divide the surface, and extracting with a processor a plurality of local points-of-interest from a global points-of-interest database for each division of the plurality of divisions. The method also includes extracting a plurality of prominence values from the global points-of-interest database, wherein each prominence value corresponds to a local point-of-interest from the plurality of local points-of-interest. The method further includes determining a plurality of centroid values from the plurality of prominence values for each division from the plurality of divisions, wherein each centroid value is determined as a function of the plurality of predefined zoom levels, and the plurality of centroid values are grouped according to the plurality of predefined zoom levels.

Moreover, the method includes constructing a plurality of centroid surfaces from the plurality of centroid values and assigning a predefined zoom level from the plurality of predefined zoom levels to each local point-of-interest based on a comparison of the prominence value corresponding to the local point-of-interest with a centroid surface from the plurality of surface.

In one embodiment, the method further includes establishing in the computer-readable medium one or more databases, such as a local points-of-interest database operative to store the extracted plurality of local points-of-interest and the extracted plurality of prominence values, a centroid database operative to store the plurality of centroid values, and a zoom level assignment database operative to store the assignments of the plurality of predefined zoom levels to the plurality of local points-of-interest.

In another embodiment, the method further includes extracting the plurality of local points-of-interest from the global points-of-interest database based on a provided characteristic for the plurality of local points-of-interest.

In yet another embodiment, the method further includes determining the plurality of centroid values from each plurality of prominence values for each division from the plurality of divisions based on the density of the local points-of-interest occurring within each division.

In yet a further embodiment of the method, each centroid value of the plurality of centroid values corresponds to a predefined zoom level of the plurality of predefined zoom levels.

In another embodiment, the method further includes determining the displayability of a selected local point-of-interest from the plurality of local points-of-interest based on a predefined zoom level assigned to the selected local point-of-interest.

In a further embodiment of the method, a first local point-of-interest of the plurality of local points-of-interest corresponds to a first prominence value, a second local point-of-interest of the plurality of local points-of-interest corresponds to a second prominence value having an approximate value as the first prominence value, and the method further includes assigning the first local point-of-interest a first predefined zoom level from the plurality of predefined zoom levels, and assigning the second local point-of-interest a second predefined zoom level different than the first predefined zoom level from the plurality of predefined zoom levels.

In yet another embodiment of the method, the predefined zoom levels comprise a low zoom level corresponding to a first height furthest from the surface, a high zoom level corresponding to a second height closest to the surface, and a middle zoom level corresponding to a third height that is less than the first height but greater than the second height. The method also includes constructing a first centroid surface corresponding to the low zoom level, constructing a second of centroid surface corresponding to the middle zoom level, and constructing a third centroid surface corresponding to the high zoom level.

In another embodiment of the method, each centroid value for a given one of the plurality of divisions is determined according to an exponential increase in the number of local points-of-interest displayable at a predefined zoom level for the given division.

In a further embodiment of the method, the predefined zoom level is assigned to the local point-of-interest when the prominence value corresponding to the local point-of-interest exceeds the centroid surface corresponding to the predefined zoom level.

DETAILED DESCRIPTION

The client devices 102-108 may request to display one or more electronic maps having points-of-interest of varying prominence from the density smoothing server 110. The electronic maps may be any type of maps, such as topological maps, street maps, nautical maps, or any other type of electronic map now known or later developed. Moreover, the electronic maps may be Internet-related documents, such as Hypertext Markup Language ("HTML") documents, Javascript documents, CSS documents, Extensible Markup Language ("XML") documents, or any other Internet-related documents now known or later developed.

Figure 1:
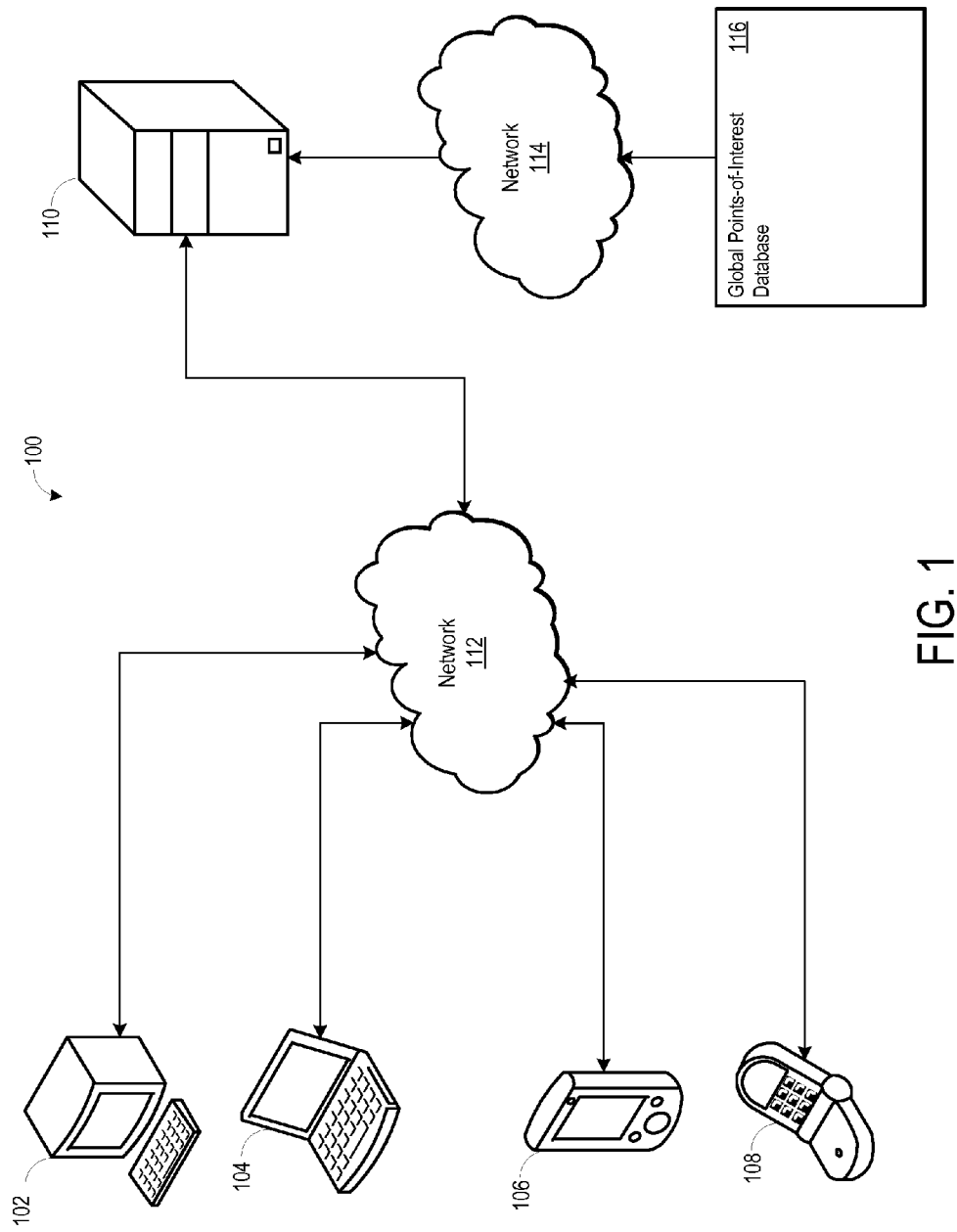
FIG. 1 illustrates one example of client devices in communication with a density smoothing server to display points-of-interest on an electronic map.

FIG. 1 illustrates one example of a system 100 having client devices 102-108 in communication with a density smoothing server 110 via a network 112. The client devices 102-108 may be any type of client devices, such as a desktop computer 102, a laptop computer 104, a personal display assistant 106, a mobile phone 108, or any other type of client device.

In one embodiment, the density smoothing server 110 is an electronic map provider operative to provide an electronic map for access by the client devices 102-108. In another embodiment, the density smoothing server 110 is turn-by-turn navigation system operative to provide turn-by-turn directions on an electronic map for access by the client devices 102-108. Other embodiments of the density smoothing server 110 are also possible, such as a point-to-point navigation system, traffic congestion system, business review system, or any other type of system operative to provide an electronic map. The density smoothing server 110 may also be a combination of one or more systems as described herein, such as a combination of an electronic map provider and a turn-by-turn navigation system.

The density smoothing server 110 and the client devices 102-108 may communicate through a network 112. For example, one or more client devices 102-108 may transmit a request for one or more electronic maps to the density smoothing server 110. In response, the density smoothing server 110 may transmit the one or more electronic maps to the client devices 102-108. Moreover, the density smoothing server 110 may facilitate the display of one or more points-of-interest on the electronic maps based on a zoom level for viewing the electronic map.

Although FIG. 1 illustrates that the client devices 102-108 are in communication with a single density smoothing server 110, the client devices 102-108 may be in communication with multiple density smoothing servers (not shown) via the network 112. Furthermore, the client devices 102-108 may be in communication with each other. In addition, a single density smoothing server 110 may include multiple density smoothing servers, and a single client device, such as a client device 102, may include multiple client devices.

In addition to client devices 102-108, the density smoothing server 110 may communicate with a global points-of-interest database 116 via a network 114. The global points-of-interest database 116 may maintain a worldwide database of points-of-interest and the geographical location for each of the points-of-interest. A point-of-interest may be a business, a park, a recreational facility, a landmark, a distinguishing geographical feature, a government facility, or any other type of point-of-interest. In addition, each point-of-interest in the global points-of-interest database 116 may be associated with a prominence value that indicates the prominence ranking of the point-of-interest. For example, a landmark, such as Mount Rushmore or Mount Kilimanjaro, may have a higher prominence ranking than a locally owned business. A point-of-interest may have an associated type that indicates the type of point-of-interest. For example, Mount Rushmore may have a different prominence type than a locally owned business.

In one embodiment, the global points-of-interest database 116 maintains a ranking of all global points-of-interest entered into the global points-of-interest database 116. Hence, a point-of-interest appearing in Russia may be ranked or compared against a point-of-interest appearing in the United States. Alternatively, the global points-of-interest database 116 may maintain a ranking of points-of-interest organized according to regions. Hence, points-of-interest appearing in the Western Hemisphere may be compared with other points-of-interest appearing in the Western Hemisphere. Moreover, the organization of the points-of-interest may be defined with additional granularity, such that points-of-interest appearing in a specific country, state, or city, are compared with other points-of-interest appearing in that specific country, state, or city. Other levels of granularity are also possible. In one embodiment, to retrieve a point-of-interest and its associated prominence value, the density smoothing server 110 may transmit a geographical region, such as in latitude and longitude, and request that the global points-of-interest database 116 transmit one or more points-of-interest appearing in the region defined by the latitude and longitude.

Figure 2:
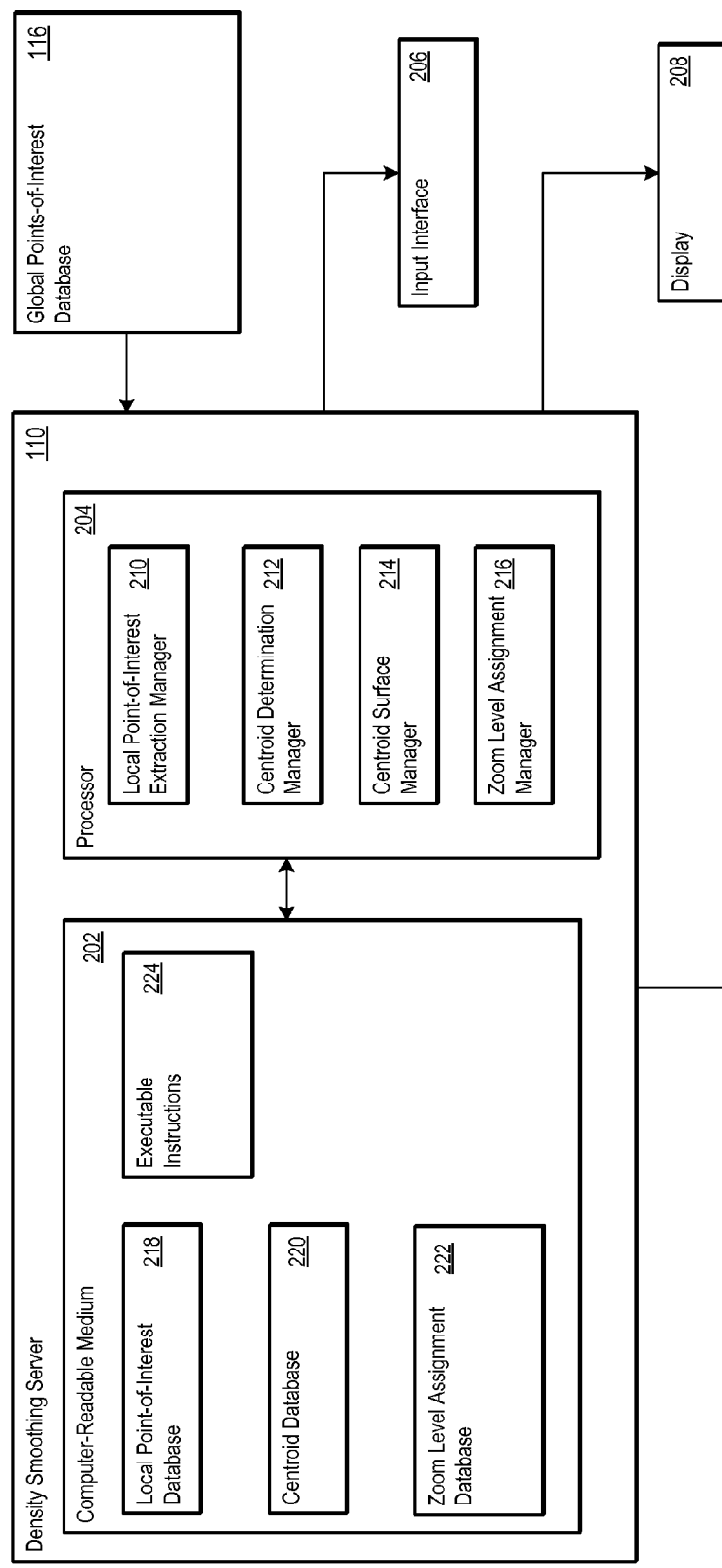
FIG. 2 illustrates one example of a density smoothing server from FIG. 1, in accordance with aspects of the invention.

FIG. 2 illustrates one example of a density smoothing server 110 in communication with the global points-of-interest database 116. The discussion below refers to FIG. 2 as well as FIG. 3, which illustrates one example of an overview of logic flow 302 for assigning one or more zoom levels to one or more local points-of-interest, in accordance with aspects of the invention.

In one embodiment, the density smoothing server 110 includes a computer-readable medium 202 and a processor 204 in communication with an input interface 206 and a display 208. The processor 204 may also be in communication with other components of the density smoothing server 110, such as a network interface (not shown), a modem (not shown), an optical drive (not shown), or any other component.

The computer-readable medium 202 may include one or more components for facilitating the assignment of zoom levels to one or more points-of-interest retrieved from the global points-of-interest database 116. In one embodiment, the computer-readable medium 202 may include executable instructions 224 for defining one or more managers executable by the processor 204. When executed, the executable instructions 224 may implement a local point-of-interest extract manager 210, a centroid determination manager 212, a centroid surface manager 214, and a zoom level assignment manager 216. The computer-readable medium 202 may also include one or more databases for storing information used by the managers 210-216. For example, the computer-readable medium 202 may include a local points-of-interest database 218, a centroid database 220, and a zoom level assignment database 222. Alternative databases and/or managers are also possible. The processor 204 may facilitate communications and operations between one or more of the managers 210-216 and one or more of the databases 218-222.

The computer-readable medium 202 may be operative to store a plurality of predefined zoom levels for viewing a surface of an electronic map. The predefined zoom levels may include any number of zoom levels. As one example, the predefined zoom levels may include three zoom levels, such as a low zoom level corresponding to a first height furthest from the surface of the electronic map, a high zoom level corresponding to a second height closest to the surface of the electronic map, and a middle zoom level corresponding to a third height that is less than the first height but greater than the second height. Moreover, the predefined zoom levels may be of any granularity, and may include any number of zoom levels for viewing the surface of the electronic map.

Figure 3:
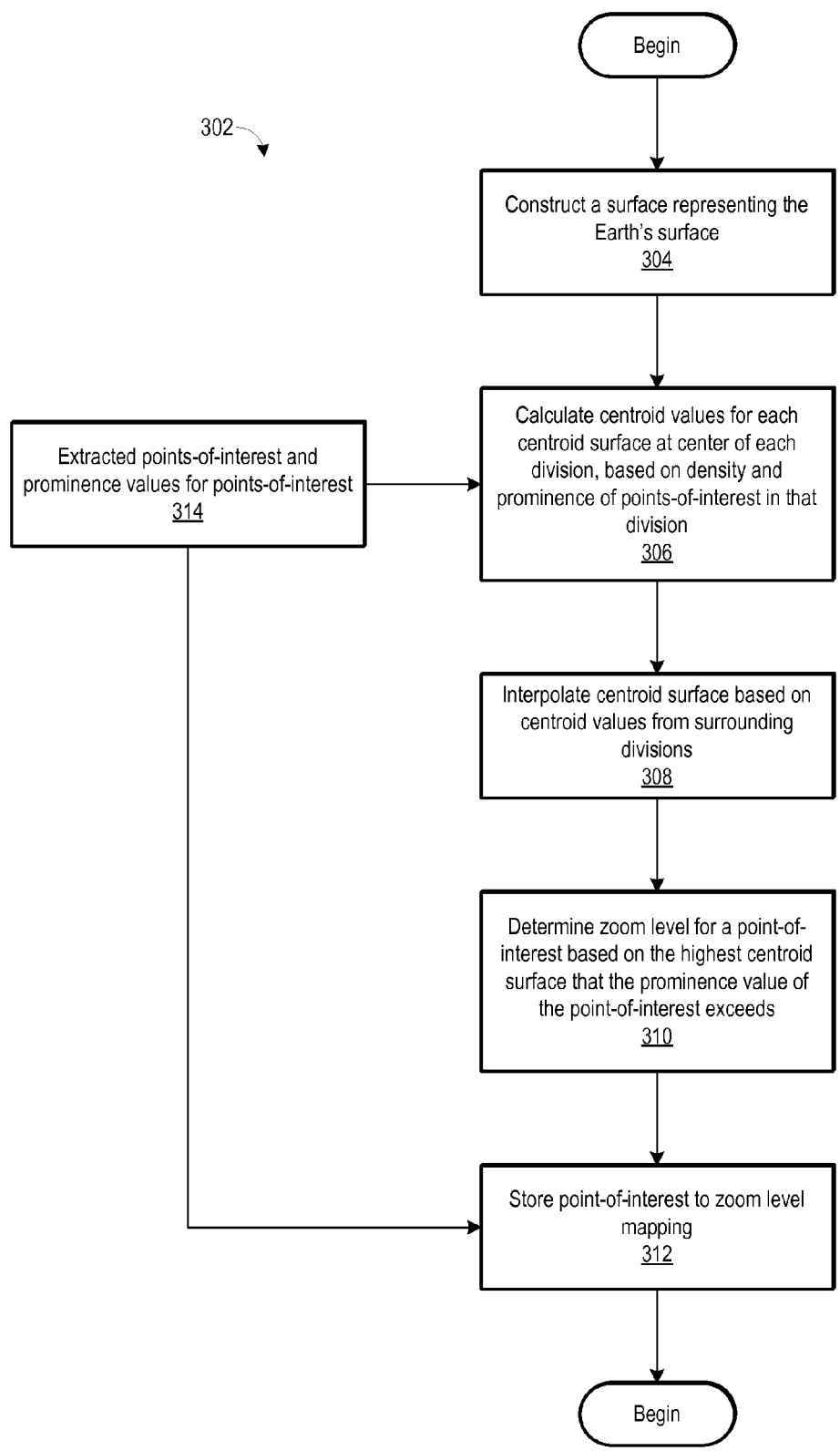
FIG. 3 illustrates one example of an overview of logic flow for assigning one or more zoom levels to one or more local points-of-interest, in accordance with aspects of the invention.

Referring to FIG. 3, and with reference to FIG. 2, the computer-readable medium 202 may also be operative to store a plurality of divisions that divide the surface of the electronic map (Block 304). The divisions may be predefined and correlated to the predefined zoom levels. For example, the density smoothing server 110 may determine, or be programmed with, the number of divisions that represent the surface. Alternatively, the divisions may be determined by one or more of the managers 210-216 each time a zoom level is provided to the one or more managers 210-216.

In one embodiment, the divisions divide the surface of the electronic map and represent logical divisions of the surface. At the lowest zoom level, the surface may be divided into one division, that is, the surface itself. With each increasing zoom level, the surface may be divided into increasing number of divisions. For example at the second lowest zoom level, the surface may be divided into four divisions, and at the third lowest zoom level, each of the four divisions from the second lowest zoom level may be divided into four divisions. Alternative divisioning schemes may also be used, such that the surface, and subsequent divisions, are divided into three divisions with each increasing zoom level, five divisions with each increasing zoom level, or other division amount with each increasing zoom level.

The local point-of-interest extraction manager 210 may be operative to extract a plurality of local points-of-interest from the global points-of-interest database 116 (Block 314). In one embodiment, the local point-of-interest extraction manager 210 is operative to extract the local points-of-interest for each division of the plurality of divisions. Hence, when provided with a division, the local point-of-interest extraction manager 210 may retrieve the corresponding local points-of-interest that appear in the provided division.

The local point-of-interest extraction manager 210 may also be further operative to extract the plurality of local points-of-interest from the global points-of-interest database based on a point-of-interest type. An example of a point-of-interest type may be "recreational facility", "park", "commercial building", "tourist attraction", or any other point-of-interest type. Hence, when provided with a point-of-interest type to extract tourist attractions, the local point-of-interest extraction manager 210 may extract such points-of-interest as the Empire State Building, the Eiffel Tower, the Leaning Tower of Pisa, or any other tourist attraction. By using a point-of-interest type, the local point-of-interest extraction manager 210 may selectively determine which types of points-of-interest to extract from the global points-of-interest database 116.

In addition, the local point-of-interest extraction manager 210 may extract a plurality of prominence values from the global points-of-interest database 116, wherein each prominence value of the plurality of prominence values correspond to a local point-of-interest from the plurality of local points-of-interest (Block 314). For example, when provided with a division, such as a division encompassing New York City, the local point-of-interest extraction manager may extract a local point-of-interest representing the Empire State Building along with an associate prominence value, such as 100 (or any other value representing prominence).

As the local point-of-interest extraction manager 210 extracts each of the local points-of-interest and their corresponding prominence values from the global points-of-interest database 116, the local point-of-interest extract manager may store the extracted local points-of-interest and their corresponding prominence values in one or more databases. For example, the local point-of-interest extraction manager 210 may store the local points-of-interest and their corresponding prominence values in the local points-of-interest database 218. In addition, the local point-of-interest extract manager 210 may also store a division identifier that identifies the division of the surface of the electronic map to which the local point-of-interest stored in the local points-of-interest database 218 belongs. Furthermore, a local point-of-interest stored in the local points-of-interest database 218 may be associated with one or more division identifiers.

The centroid determination manager 212 is operative to determine a plurality of centroid values from each of the plurality of prominence values for each division from the plurality of divisions (Block 306). In other words, for each division of the surface, the centroid determination manager 212 is operative to determine a set of centroid values that represent "cutoff points," and the centroid determination manager 212 may determine a centroid value for each predefined zoom level for each division. Hence, the centroid determination manager 212 may determine multiple cutoff points for each division. Accordingly, a centroid for a division may include multiple centroid values determined to be cutoff points. The centroid determination manager 212 may determine the cutoff points not only as a function of the number of zoom levels for the division, but also on the prominence values for the local points-of-interest appearing in the division.

Moreover, the centroid determination manager 212 may account for the density of local points-of-interest appearing in a division. In a division where there is a higher density of lower prominence than there are higher prominence values, the centroid determination manager 212 may determine the centroid values of the division from the group of local points-of-interest having lower prominence values. In one embodiment where the centroid determination manager 212 determines one or more prominence values, each centroid value for a division is determined by considering the prominence values of local points-of-interest, the quantity of which increases exponentially as the area represented by the predefined zoom level for the division increases. In considering the density of prominence values as a factor in selecting one or more centroid values, the centroid determination manager 212 may further account for the differential between the lower prominence values and the higher prominence values.

The centroid determination manager 212 may employ one or more selection schemes for determining the centroid values of the centroids for each division. In one embodiment, the selection of cutoff points (i.e., centroid values for each centroid) is determined according to the prominence values of local points-of-interest appearing in the division of the surface of the electronic map. For example, the centroid determination manager 212 may proceed by the following assertion: If each level of zoom depth decreases the actual area visible on the electronic map by a factor of n, then each zoom level displays n times as many points-of-interest as the one before. Based on this assertion, cutoff points for a centroid are selected from the list of local prominence values of the local points-of-interest for a division such that the highest zoom level may display 100% of the local points-of-interest, the second lowest zoom level may display $$\left(\frac{100}{n}\right)\%$$

of the local points-of-interest, the third lowest zoom level may display $$\left(\frac{100}{n^2}\right)\%$$

of features, and so on (e.g., for the $m^{th}$ zoom level, $$\left(\frac{100}{n^m}\right)\%).$$

In this manner, the centroid determination manager 212 may determine centroids and their corresponding centroid values for each of the divisions of the surface of the electronic map.

The centroid determination manager 212 may store one or more centroids and their centroid values in one or more databases. In one embodiment, the centroid determination manager 212 stores the determined centroid values in a centroid database 220. The centroid determination manager 212 may also store a centroid division identifier that identifies the division of the surface of the electronic map associated with the determined centroid values.

Figure 4:
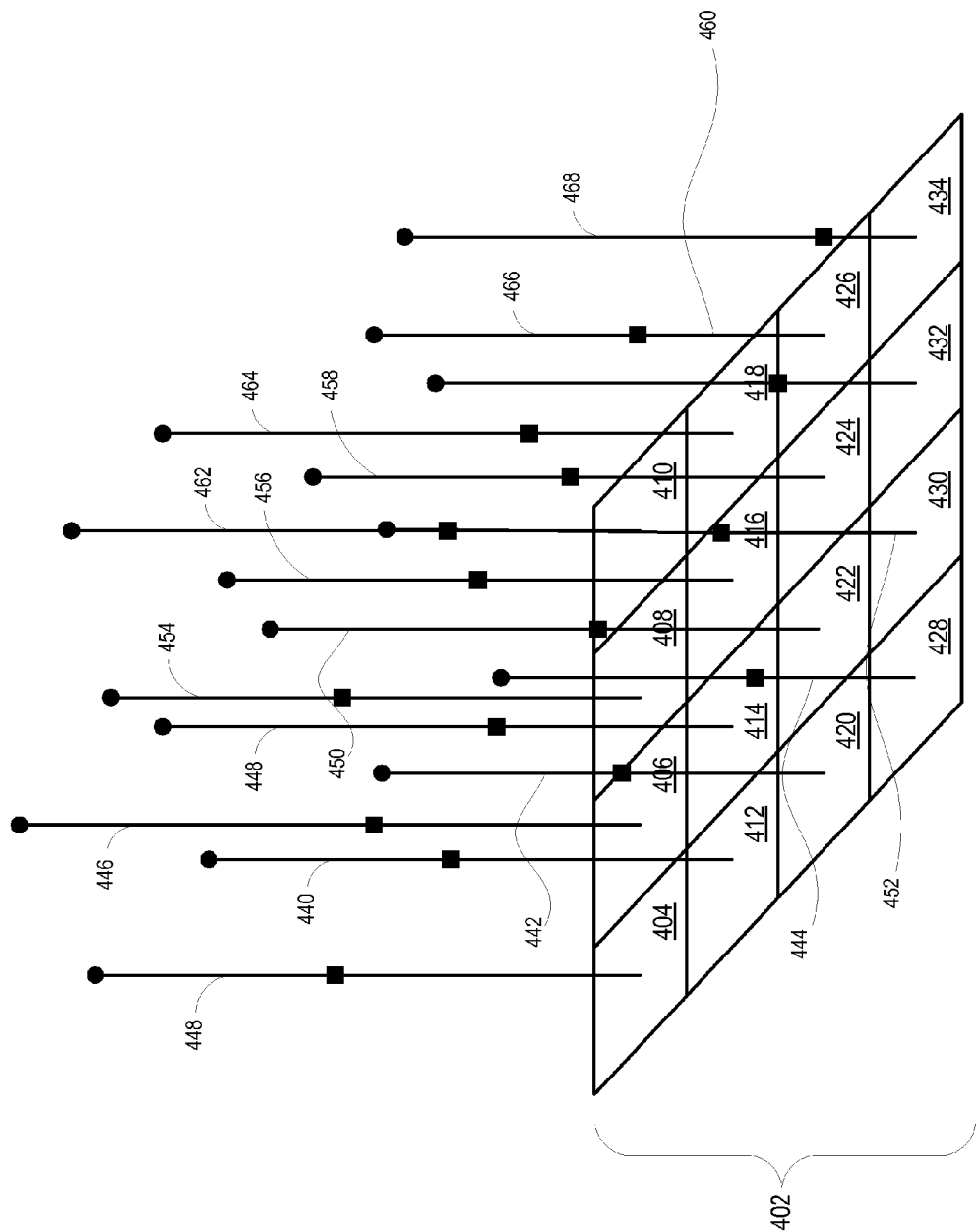
FIG. 4 illustrates one example of a sub-divided surface having centroids determined for each division.

FIG. 4 provides an example of a surface 402 of an electronic map having multiple divisions 404-434. As discussed previously, the divisions 404-434 may be previously determined and stored in the computer-readable medium 202 or may be determined by one or more of the managers 210-216. As shown in FIG. 4, the centroid determination manager 212 has determined centroids 438-468 for each of the divisions 404-434. To assist the reader, the following description provides a guide for identifying each individual centroid: Starting with division 404 as the beginning of a first column, the centroids for the first column include centroid 438, centroid 440, centroid 442, and centroid 444; starting with division 406 as the beginning of a second column, the centroids for the second column include centroids 446-452; starting with division 408 as the beginning of a third column, the centroids for the third column include centroids 454-460; and, starting with division 410 as the beginning of a fourth column, the centroid for the fourth column include centroids 462-468.

Figure 5:
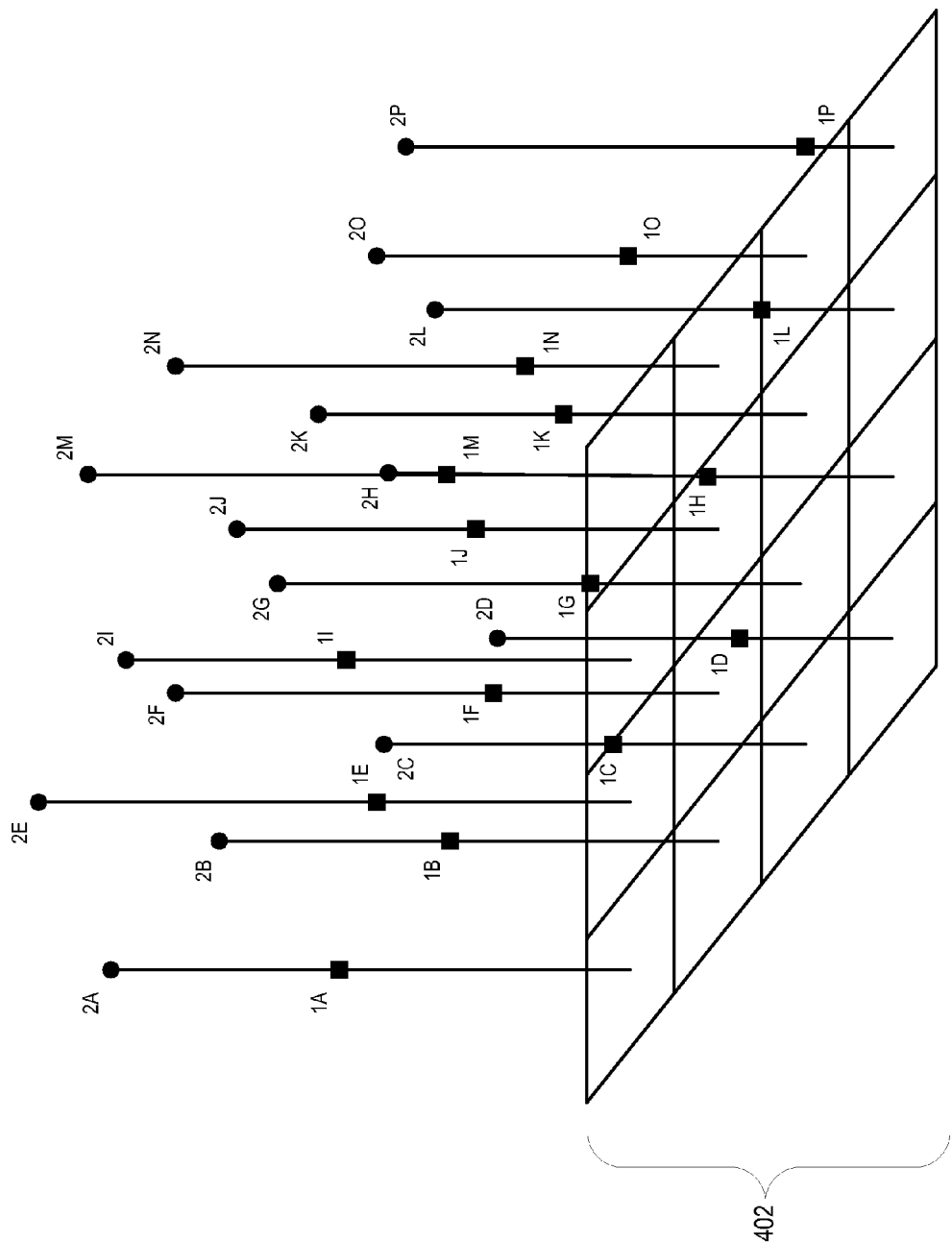
FIG. 5 illustrates examples of centroid values determined for multiple centroids of corresponding divisions in the surface shown in FIG. 3.

For clarity, FIG. 5 is a reproduction of the surface 402 and centroids 438-468 shown in FIG. 4. However, FIG. 5 further highlights the centroid values determined by the centroid determination manager 212 for each of the centroids 438-468 for each of the divisions 404-434 of the surface 402. In the exemplary surface 402 shown in FIG. 5, the density smoothing server 110 may be configured with three predefined zoom levels; hence, the centroid determination manager 212 may determine at least two centroid values for each of the centroids 438-468. For example, the centroid determination manager 212 has determined a first centroid value 1A and a second centroid value 2A for the centroid 438. Similarly, the centroid determination manager 212 has determined a first centroid value 1P and a second centroid value 2P for the centroid 468.

In the representation shown in FIG. 5, where the highest zoom level is closest to the surface 402, centroid values 1A-1P may correspond to a middle zoom level that is further from the surface 402 than the highest zoom level, and centroid values 2A-2P may correspond to a lowest zoom level that is furthest from the surface 402. Accordingly, each of the centroids 438-468 may have at least two centroid values. Moreover, depending on the granularity of the predefined zoom levels, the centroid determination manager 212 may determine alternative (additional and/or fewer) centroid values for each of the centroids 438-468. Furthermore, the centroid values 1A-1P and 2A-2P may be determined according to criteria other than predefined zoom levels, such as from an input from the input interface 206.

Figure 6:
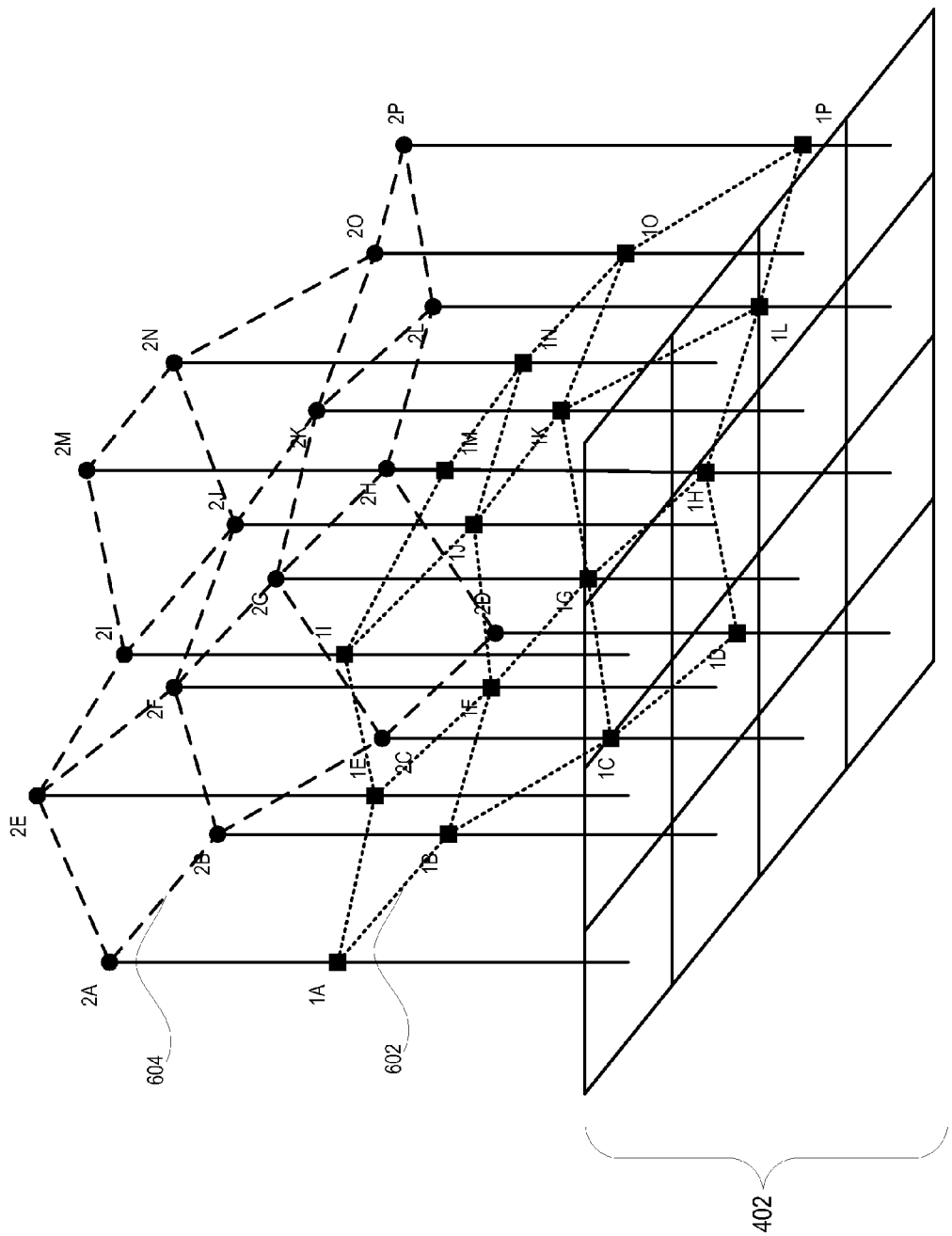
FIG. 6 illustrates one example of centroid surfaces constructed by the density smoothing server based on the centroid values shown in FIG. 4.

Referring back to FIG. 2 and FIG. 3, and with further reference to FIG. 6, the centroid surface manager 214 is operative to construct one or more centroid surfaces from the centroid values determined by the centroid determination manager 212 (Block 308). In one embodiment, the centroid surface manager 214 may retrieve the centroid values from the centroid database 220. In addition, the centroid surface manager 214 may retrieve a predefined zoom level corresponding to one or more of the centroid values retrieved from the centroid database 220 to determine which centroid values should be included in a particular centroid surface. The centroid surface manager 214 may then construct the one or more centroid surfaces through interpolation of the centroid values according to the retrieved predefined zoom levels. One example of an interpolation that may be used to determine the centroid surfaces is bilinear interpolation.

Referring to FIG. 6 and based on the centroid values from FIG. 4, the centroid surface manager 214 may construct a first centroid surface 602 corresponding to a first zoom level. Assuming that there are three predefined zoom levels, this first zoom level may be a middle zoom level. As shown in FIG. 6, the first centroid surface 602 may be constructed from centroid values 1A-1P, where the corner vertices of the first centroid surface 602 include (clockwise) centroid value 1A, centroid value 1M, centroid value 1P, and centroid value 1D.

Similarly, based on the centroid values determined by the centroid determination manager 212 as shown in FIG. 5, the centroid surface manager 214 may construct a second centroid surface 604 corresponding to a second zoom level. As before, assuming that there are three predefined zoom levels, this second zoom level may be a lowest zoom level; that is, a zoom level furthest from the surface 402. The second centroid surface 604 may be constructed from centroid values 2A-2P, where the corner vertices of the second surface 604 include (clockwise) centroid value 2A, centroid value 2M, centroid value 2P, and centroid value 2D. Although the centroid surfaces 602-604 are shown as being constructed from centroid values 1A-1P and centroid values 2A-2P, it should be understood that each centroid surface 602-604 may be constructed from a range of centroid values. For example, with reference to the first centroid surface 602, there are a range of centroid values between centroid value 1A and centroid value 1D, and this range of centroid values include centroid value 1B and centroid value 1C. Hence, when the centroid surface manager 214 constructs a surface, it should be understood that the centroid surface may include the range of centroid values used to construct the centroid surface.

Figure 7:
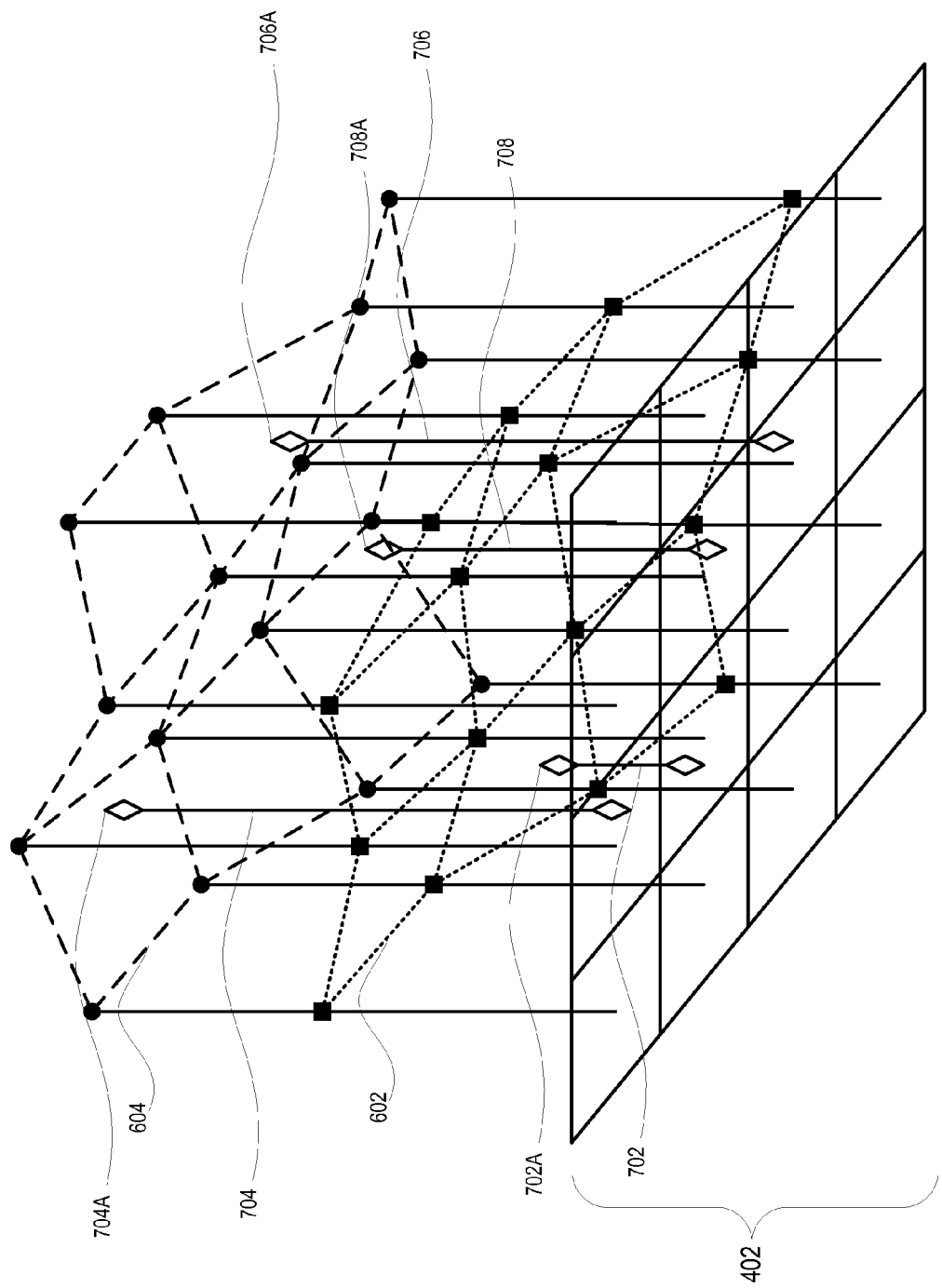
FIG. 7 illustrates one example of a set of local points-of-interest to be assigned a zoom level, in accordance with aspects of the invention.

With reference to FIG. 2 and FIG. 3, and with further reference to FIG. 7, the zoom level assignment manager 216 is operative to assign a predefined zoom level from the predefined zoom levels stored in the computer-readable medium 202 to each of the local points-of-interest extracted by the local point-of-interest extract manager 210 (Block 310). Alternatively, the zoom level assignment manager 216 may assign a determined zoom level previously determined by one or more of the managers 210-216. The zoom level assignment manager 216 may be operative to assign a zoom level to a local point-of-interest based on a comparison of the prominence value corresponding to the local point-of-interest with a centroid surface determined by the centroid surface manager 214. A centroid surface is but one example of a prominence threshold that the zoom level assignment manager 216 may employ to determine or assign a zoom level to a local point-of-interest. The zoom level assignment database 222 may be operative to store the assignments of the plurality of predefined zoom levels to the plurality of local points-of-interest determined by the zoom level assignment manager 216 (Block 312).

FIG. 7 illustrates one example of a set of local points-of-interest 702-708 to be assigned a zoom level by the zoom level assignment manager 216. Each of the local points-of-interest have been previously assigned a prominence value 702A-708A. Although the zoom level assignment manager 216 may proceed sequentially starting with division 404 of the surface 402, for expediency, the example below starts with the first local point-of-interest 702.

Starting with the first local point-of-interest 702, the zoom level assignment manager 216 first compares the prominence value 702A of the first local point-of-interest 702 with the first surface 602. Based on this comparison, the zoom level assignment manager 216 will determine that the first prominence value 702A does not exceed the first surface 602; hence, the zoom level assignment manager 216 will assign the highest zoom level (i.e., the zoom level closest to the surface) to the local point-of-interest 702.

Proceeding next to the second local point-of-interest 704, the zoom level assignment manager 216 compares the second prominence value 704A with the first surface 602 and then, determining that the second prominence value 704A exceeds the first surface 602, the zoom level assignment manager 216 compares the second prominence value 704A with the second surface 604. Based on this comparison, the zoom level assignment manager will determine that the prominence value 704A of the second local point-of-interest 704 does not exceed the second surface 604; hence, the zoom level assignment manager 216 will assign a middle zoom level to the second local point-of-interest 704. Based on the foregoing examples of the first local point-of-interest 702 and the second local point-of-interest 704, the zoom level assignment manager 216 will undertake similar operations with regard to the third local point-of-interest 706 and the fourth local point-of-interest 708.

Of particular note is the assignment of the zoom level to the third local point-of-interest 706. As shown in FIG. 7, the second local point-of-interest 704 and third local point-of-interest 706 have approximately equal prominence values (704A and 706A, respectively). However, the third prominence value 706A exceeds the second surface 604; hence, the third local point-of-interest 706 will be assigned to the lowest zoom level (i.e., the zoom level furthest from the surface 402). The third prominence value 706A may exceed the second surface 604 while the second prominence value 704A may not exceed the second surface 604 because the second local point-of-interest n04 may be in an area (i.e., division 406) where there are a greater number of local points-of-interest having higher prominence values than the second prominence value 704A. Similarly, the third local point-of-interest 706 may be in an area (i.e., division 424) where there are a greater number of local points-of-interest having lower prominence values than the third prominence value 706A. Hence, even though the second local point-of-interest 704 and the third local point-of-interest 706 may be of approximately equal prominence, these points-of-interest may be assigned different zoom levels.

Figure 8:
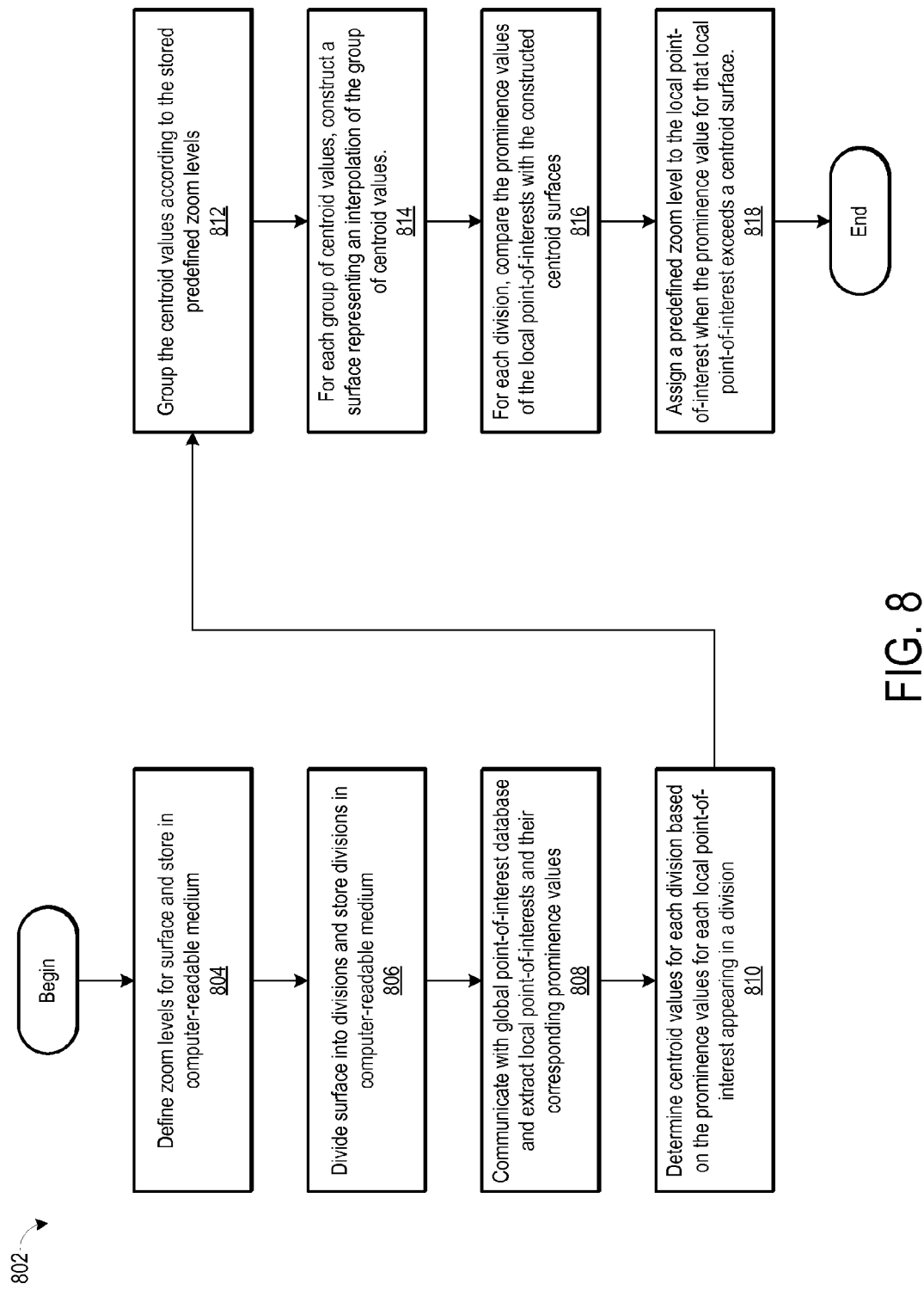
FIG. 8 illustrates another example of logic flow for assigning one or more zoom levels to one or more local points-of-interest, in accordance with aspects of the invention.

FIG. 8 illustrates one example of logic flow 802 for assigning one or more zoom levels to one or more local points-of-interest. With reference to FIG. 2, the logic flow 802 describes that, initially, one or more zoom levels may be defined for a surface and stored in the computer-readable medium 202 (Block 804). Thereafter, the surface of the electronic map may be divided into one or more divisions and stored in the computer-readable medium (Block 806). The local point-of-interest extraction manager 210 may then communicate with a global point-of-interest database 116 to extract one or more local points-of-interest and corresponding prominence values for the one or more local points-of-interest (Block 808). As discussed previously the extraction of the local points-of-interest may be based on the divisions of the surface stored in the computer-readable medium 202.

The density smoothing server 110 then proceeds to assign zoom levels to the local points-of-interest for display on the electronic map. The centroid determination manager 212 may determine or one or more centroids for each of the divisions stored in the computer-readable medium 202 (Block 810). The centroid determination manager 212 may further determine one or more centroid values for each of the centroids based on the zoom levels stored in the computer-readable medium 202. As discussed previously, the centroid values for the divisions may be determined based on the density of points-of-interest in a division, the prominence values for the various points-of-interest in the division, and/or the number of predefined zoom levels stored in the computer-readable medium 202. The centroid surface manager 214 may then proceed to determine one or more centroid surfaces based on the determined centroid values. The one or more centroid surfaces may be determined by interpolating one or more centroid values, such as through bilinear interpolation.

In one embodiment, the centroid surface manager 214 may determine the centroid surfaces according to the zoom levels stored in the computer-readable medium (Block 804). For each of the zoom levels, the centroid surface manager 214 may construct a centroid surface that includes one or more centroid values (Block 814). For example, each zoom level may have a corresponding centroid surface. Thereafter, for each division of the surface of the electronic map, the zoom level assignment manager 216 may compare the prominence values of the local points-of-interest with the height of the surface at the location of the point-of-interest. (Block 816). After comparing the prominence values of the local points-of-interest with the one or more centroid values defining a centroid surface, the zoom level assignment manager 216 may then assign a zoom level to the local point-of-interest (Block 818).

In one embodiment, a zoom level is assigned to a local point-of-interest that corresponds to the highest zoom level of a centroid surface for which the prominence value of the local point-of-interest exceeds. In an alternative n, a zoom level may be assigned to a local point-of-interest that corresponds to the highest zoom level of a centroid surface for which the prominence value of the local point-of-interest does not exceed. Alternative schemes for assigning zoom levels to the local points-of-interest are also possible.

Referring back to FIG. 1, when a client device, such as the client device 102, requests an electronic map from the density smoothing server 110, the density smoothing server 110 may determine which points-of-interest that the client device 102 is to display according to a zoom level provided by the client device 102. As the client device 102 zooms in and out of the electronic map currently displayed, the density smoothing server 110 may determine which points-of-interest the client device 102 is to display or not to display. The determination of whether the client device 102 is to display a point-of-interest at a zoom level selected by the client device 102 may be based on the zoom level assigned to the points-of-interest according to the embodiments described above. In yet another embodiment, the density smoothing server 110 determines the zoom levels at which the points-of-interest are to display on the client device 102 prior to the client device 102 requesting the electronic map. Hence, when the client device 102 requests the electronic map, such as from an electronic map provider in communication with the density smoothing server 110, the electronic map may already contain the "smoothed" points-of-interest. Through this procedure of creating locally-sensitive centroid surfaces, then using the locally-sensitive centroid surfaces to determine individual feature visibility per zoom level, the density smoothing server 110 addresses the issue of preventing the occlusion of less prominent local points-of-interest by more prominent local points-of-interest. Since the centroid surfaces are locally sensitive, rather than global absolutes, differing local distributions of points-of-interest density and their corresponding prominence values may not cause undesirable variance in the visibility of local points-of-interest. Moreover, as a significant portion of the surrounding local points-of-interest are considered during the calculation of the centroid surfaces, the described density smoothing server 110 is less vulnerable to improper local occlusion.

The density smoothing server 110, databases 218-222, managers 210-216, and executable instructions 224 described above may be implemented in a single system or partitioned across multiple systems. The computer-readable medium 202 may be distributed across many different types of computer-readable media. The computer-readable medium 202 may include random access memory ("RAM"), read-only memory ("ROM"), hard disks, floppy disks, CD-ROMs, flash memory or other computer-readable medium. The databases 218-222, managers 210-216, and executable instructions 224 may also be encoded in a signal, such as a signal received from a network or partitioned into sections and received in multiple packets communicated across a network.

The density smoothing server 110, databases 218-222, managers 210-216, and executable instructions 224 may be implemented in a combination of software and hardware. The executable instructions 224 may be implemented in a computer programming language, such as C# or Java, or any other computer programming language now known or later developed. The executable instructions 224 may also be implemented in a computer scripting language, such as Javascript, PHP, ASP, or any other computer scripting language now known or later developed. Furthermore, the executable instructions 224 may be implemented using a combination of computer programming languages and computer scripting languages.

In addition, the density smoothing server 110, processor 204, databases 218-222, managers 210-216, and executable instructions 224 may be implemented with additional, different, or fewer components. As one example, the processor 204 or any other logic or component may be implemented with a microprocessor, a microcontroller, a DSP, an application specific integrated circuit (ASIC), discrete analog or digital logic, or a combination of other types of circuits or logic. The databases 218-222, managers 210-216, and executable instructions 224 may be distributed among multiple components, such as among multiple processors and memories, optionally including multiple distributed processing systems.

Logic, such as programs, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, the networks 112-114 may be implemented as any combination of networks. The networks 112-114 may be a Wide Area Network ("WAN"), such as the Internet; a Local Area Network ("LAN"); a Personal Area Network ("PAN"), or a combination of WANs, LANs, and PANs. Moreover, the networks 112-114 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Interfaces between the density smoothing server 110, databases 218-222, managers 210-216, and executable instructions 224 may be implemented using one or more interfaces, such as Web Services, SOAP, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. An apparatus for density smoothing of points-of-interest displayable on an electronic map, the apparatus comprising:
   a computer-readable medium operative to store:
      a plurality of predefined zoom levels for viewing a surface;
      a plurality of divisions that divide the surface; and
      a plurality of executable instructions that define a plurality of managers, the plurality of managers comprising:
         a local point-of-interest extraction manager;
         a centroid determination manager;
         a centroid surface manager; and
         a zoom level assignment manager; and
   a processor in communication with the computer-readable medium and operative to execute the executable instructions that, when executed, cause:
      the local point-of-interest extraction manager to:
         extract a plurality of local points-of-interest from a global points-of-interest database for each division of the plurality of divisions; and
         extract a plurality of prominence values from the global points-of-interest database, wherein each prominence value of the plurality of prominence values corresponds to a local point-of-interest from the plurality of local points-of-interest;
      the centroid determination manager to:
         determine a plurality of centroid values from the plurality of prominence values for each division from the plurality of divisions stored in the computer readable medium, wherein:

each centroid value is determined as a function of the plurality of predefined zoom levels stored in the computer readable medium; and
the plurality of centroid values are grouped according to the plurality of predefined zoom levels;
the centroid surface manager to construct a plurality of centroid surfaces from the plurality of centroid values determined by the centroid determination manager; and
the zoom level assignment manager to assign a predefined zoom level from the plurality of predefined zoom levels stored in the computer-readable medium to each local point-of-interest extracted by the local point-of-interest extraction manager based on a comparison of the prominence value corresponding to the local point-of-interest with a centroid surface from the plurality of centroid surfaces determined by the centroid surface manager.

2. The apparatus of claim 1, wherein the computer-readable medium is further operative to store:
a local points-of-interest database operative to store the extracted plurality of local points-of-interest and the extracted plurality of prominence values extracted by the local point-of-interest extraction manager;
a centroid database operative to store the plurality of centroid values determined by the centroid determination manager; and
a zoom level assignment database operative to store the assignments of the plurality of predefined zoom levels to the plurality of local points-of-interest determined by the zoom level assignment manager.

3. The apparatus of claim 1, wherein execution of the executable instructions further causes the local point-of-interest extraction manager to extract the plurality of local points-of-interest from the global points-of-interest database based on a provided characteristic for the plurality of local points-of-interest.

4. The apparatus of claim 1, wherein execution of the executable instructions further causes the centroid determination manager to determine the plurality of centroid values from each plurality of prominence values for each division from the plurality of divisions based on the density of the local points-of-interest occurring within each division.

5. The apparatus of claim 1, wherein each centroid value of the plurality of centroid values corresponds to a predefined zoom level of the plurality of predefined zoom levels.

6. The apparatus of claim 1, wherein execution of the executable instructions further causes the zoom level assignment manager to determine the displayability of a selected local point-of-interest from the plurality of local points-of-interest based on a predefined zoom level assigned to the selected local point-of-interest.

7. The apparatus of claim 1, wherein:
a first local point-of-interest of the plurality of local points-of-interest corresponds to a first prominence value;
a second local point-of-interest of the plurality of local points-of-interest corresponds to a second prominence value having an approximate value as the first prominence value; and
execution of the executable instructions further causes the zoom level assignment manager to:
assign the first local point-of-interest a first predefined zoom level from the plurality of predefined zoom levels; and
assign the second local point-of-interest a second predefined zoom level different than the first predefined zoom level from the plurality of predefined zoom levels.

8. The apparatus of claim 1, wherein:
the predefined zoom levels comprise:
a low zoom level corresponding to a first height furthest from the surface;
a high zoom level corresponding to a second height closest to the surface; and
a middle zoom level corresponding to a third height that is less than the first height but greater than the second height; and
execution of the executable instructions further causes the centroid surface manager to construct:
a low level centroid surface corresponding to the low zoom level;
a middle level centroid surface corresponding to the middle zoom level; and
a high level centroid surface corresponding to the high zoom level.

9. The apparatus of claim 1, wherein each centroid value for a given one of the plurality of divisions is determined according to an exponential increase in the number of local points-of-interest displayable at a predefined zoom level for the given division.

10. The apparatus of claim 1, wherein the predefined zoom level is assigned to the local point-of-interest when the prominence value corresponding to the local point-of-interest exceeds the centroid surface value corresponding to the predefined zoom level.

11. A method for density smoothing of points-of-interest displayable on an electronic map, the method comprising:
storing in a computer-readable medium a plurality of predefined zoom levels for viewing a surface and a plurality of divisions that divide the surface;
extracting with a processor a plurality of local points-of-interest from a global points-of-interest database for each division of the plurality of divisions;
extracting a plurality of prominence values from the global points-of-interest database, wherein each prominence value corresponds to a local point-of-interest from the plurality of local points-of-interest;
determining a plurality of centroid values from the plurality of prominence values for each division from the plurality of divisions, wherein:
each centroid value is determined as a function of the plurality of predefined zoom levels; and
the plurality of centroid values are grouped according to the plurality of predefined zoom levels;
constructing a plurality of centroid surfaces from the plurality of centroid values; and
assigning a predefined zoom level from the plurality of predefined zoom levels to each local point-of-interest based on a comparison of the prominence value corresponding to the local point-of-interest with a centroid surface from the plurality of surface.

12. The method of claim 11, further comprising establishing, in the computer-readable medium:
a local points-of-interest database operative to store the extracted plurality of local points-of-interest and the extracted plurality of prominence values;
a centroid database operative to store the plurality of centroid values; and
a zoom level assignment database operative to store the assignments of the plurality of predefined zoom levels to the plurality of local points-of-interest.

13. The method of claim 11, further comprising extracting the plurality of local points-of-interest from the global points-of-interest database based on a provided characteristic for the plurality of local points-of-interest.

14. The method of claim 11, further comprising determining the plurality of centroid values from the plurality of prominence values for each division from the plurality of divisions based on the density of the local points-of-interest occurring within each division.

15. The method of claim 11, wherein each centroid value of the plurality of centroid values corresponds to a predefined zoom level of the plurality of predefined zoom levels.

16. The method of claim 11, further comprising determining the display ability of a selected local point-of-interest from the plurality of local points-of-interest based on a predefined zoom level assigned to the selected local point-of-interest.

17. The method of claim 11, wherein:
a first local point-of-interest of the plurality of local points-of-interest corresponds to a first prominence value;
a second local point-of-interest of the plurality of local points-of-interest corresponds to a second prominence value having an approximate value as the first prominence value; and
the method further comprises:
assigning the first local point-of-interest a first predefined zoom level from the plurality of predefined zoom levels; and
assigning the second local point-of-interest a second predefined zoom level different than the first predefined zoom level from the plurality of predefined zoom levels.

18. The method of claim 11, wherein:
the predefined zoom levels comprise:
a low zoom level corresponding to a first height furthest from the surface;
a high zoom level corresponding to a second height closest to the surface; and
a middle zoom level corresponding to a third height that is less than the first height but greater than the second height; and
the method further comprises:
constructing a first centroid surface corresponding to the low zoom level;
constructing a second of centroid surface corresponding to the middle zoom level; and
constructing a third centroid surface corresponding to the high zoom level.

19. The method of claim 11, wherein each centroid value for a given one of the divisions is determined according to an exponential increase in the number of local points-of-interest displayable at a predefined zoom level for the given division.

20. The method of claim 11, wherein the predefined zoom level is assigned to the local point-of-interest when the prominence value corresponding to the local point-of-interest exceeds the centroid surface corresponding to the predefined zoom level.

\* \* \* \* \*